(12) United States Patent
Park et al.

(10) Patent No.: US 6,990,295 B2
(45) Date of Patent: Jan. 24, 2006

(54) METHOD AND APPARATUS FOR MONITORING WDM OPTICAL SIGNAL

(75) Inventors: Sung-Jin Park, Pohang-shi (KR); Seong-Ha Kim, Suwon-shi (KR); Kwan-Woong Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 10/054,049

(22) Filed: Jan. 22, 2002

(65) Prior Publication Data

US 2003/0025963 A1 Feb. 6, 2003

(30) Foreign Application Priority Data

May 2, 2001 (KR) ........................................ 2001-23695

(51) Int. Cl.
*H04B 10/08* (2006.01)

(52) U.S. Cl. ............................................ 398/34; 398/95

(58) Field of Classification Search .................. 398/34, 398/93, 95, 196; 372/32
See application file for complete search history.

(56) References Cited

FOREIGN PATENT DOCUMENTS

| EP | 0714182 A2 | 5/1996 |
| EP | 0773640 A2 | 5/1997 |
| JP | 08-082554 | 3/1996 |
| WO | WO 00/13350 | 3/2000 |
| WO | WO 00/41351 | 7/2000 |
| WO | WO 200041351 A2 * | 7/2000 |

* cited by examiner

*Primary Examiner*—Jason Chan
*Assistant Examiner*—Christina Y Leung
(74) *Attorney, Agent, or Firm*—Cha & Reiter, L.L.C.

(57) ABSTRACT

There is provided an optical signal monitoring method and apparatus for measuring the characteristics of an input WDM optical signal. In the optical signal monitoring method, the WDM optical signal is combined with reference lights at both sides of the WDM optical signal on the wavelength spectrum. The combined signal is input to a filter having a variable transmission wavelength according to an applied driving voltage. A driving voltage-light intensity graph of a combined optical signal detected from the filter is derived in its overall wavelength band. A linear approximated wavelength is obtained with respect to a driving voltage and a non-linear compensated wavelength is calculated in a predetermined non-linear compensation formula with the driving voltage and the operation temperature of the filter.

20 Claims, 17 Drawing Sheets

METHOD AND APPARATUS FOR MONITORING WDM OPTICAL SIGNAL

CLAIM OF PRIORITY

This application claims priority to an application entitled "Method and Apparatus for Monitoring WDM Optical Signal" filed in the Korean Industrial Property Office on May 2, 2001 and assigned Serial No. 2001-23695.

BACKGROUND OF THE INVENTION

1. Field of the Invention

The present invention relates generally to a wavelength division multiplexing (WDM) optical communication system, and in particular, to a method and apparatus for monitoring a wavelength division multiplexed (WDM) optical signal transmitted from the WDM optical communication system.

2. Description of the Related Art

A WDM optical communication system transmits an optical signal with a plurality of channels. Due to its high transmission efficiency and large data capacity, the WDM optical communication system is widely used for the ultra high speed Internet. Since a WDM optical signal is attenuated as its transmitting distance increases, there is a need for a method and apparatus for monitoring the characteristics of the WDM optical signal such as wavelength and intensity.

Optical signal monitoring apparatuses using a fiber Fabry-Perot filter have been popular since it is small and has a high resolution. The transmission wavelength of the fiber Fabry-Perot filter varies according to a driving voltage. When the driving voltage is applied linearly, the transmission wavelength changes non-linearly. Moreover, the optical Fabry-Perot filter experiences changes in its transmission wavelength according to its operation temperature.

FIG. 1 is a schematic view of a conventional WDM optical signal monitoring apparatus. In FIG. 1, there is shown an optical fiber 110, a Fabry-Perot filter 130, an optical detector 150, an analog-digital converter (ADC) 160, a controller 170, a digital-analog converter (DAC) 180, and a filter driver 190. During operation, an optical signal 120 including a WDM optical signal 122 and two reference lights 124,126 propagates in the optical fiber 110.

The Fabry-Perot filter 130 has a transmission wavelength that varies according to a linearly applied driving voltage 195. That is, the Fabry-Perot filter 130 passes only an optical signal with a predetermined wavelength at a predetermined driving voltage without passing optical signals with other wavelengths. As the driving voltage 195 applied to the Fabry-Perot filter 130 linearly increases, the transmission wavelength of the Fabry-Perot filter 130 also increases gradually.

The optical detector 150 converts a WDM optical signal 140 received from the Fabry-Perot filter 130 to an analog optical detection signal 155. The ADC 160 converts the analog optical detection signal 155 to a digital optical detection signal 165. The DAC 180 converts a digital driving signal 175 received from the controller 170 to an analog driving signal 185. The filter driver 190 applies a driving voltage to the Fabry-Perot filter 130 in accordance with the analog driving signal 185.

The controller 170 outputs the digital driving signal 175 and receives the digital optical detection signal 165 from the ADC 160. The controller 170 also derives a linear approximation formula from wavelengths of the two reference lights 124,126 and driving voltages corresponding to the reference wavelengths detected from the digital optical detection signal 165. The controller 170 also determines the wavelengths of the signal channels 122 using the linear approximation formula.

FIG. 2 illustrates a graph 210 showing linear approximated wavelengths and a graph 220 showing real transmission wavelengths for the fiber Fabry-Perot filter 130 of FIG. 1. As shown in FIG. 2, the real transmission wavelength of the fiber Fabry-Perot filter 130 changes non-linearly with respect to the linearly applied driving voltage 195. The conventional optical signal monitoring apparatus approximates the real transmission wavelength graph 220 to the linear graph 210. That is, a linear approximation formula is formed using the predetermined wavelengths $X_1, X_2$ that define a predetermined wavelength band to be measured, which is the wavelength of an optical signal to be measured within the predetermined wavelength band. Further, the driving voltages $V_1, V_2$ are also used, which are related to the predetermined wavelengths $X_1, X_2$. Then the real wavelength graph 220 is approximated to the linear graph 210 satisfying the linear approximation formula which is defined as:

$$x = \frac{X_1 - X_2}{V_1 - V_2}(v - V_1) + X_1 \tag{1}$$

where x is a linear approximated wavelength and v is a driving voltage related with x. For example, if a predetermined optical signal is detected upon application of a third driving voltage $V_3$ to the fiber Fabry-Perot filter 130, the predetermined optical signal is measured to have a fourth transmission wavelength $X_4$, though, its real transmission wavelength is a third transmission wavelength $X_3$.

As described above, the conventional optical signal monitoring apparatus using a fiber Fabry-Perot filter has a drawback in that the non-linearity of the transmission wavelength graph of the fiber Fabry-Perot filter is not appropriately compensated. That is, because the conventional optical signal monitoring apparatus is based on the assumption that the transmission wavelength graph of the fiber Fabry-Perot filter is linear, the measured wavelength of an input optical signal differs from its real wavelength.

SUMMARY OF THE INVENTION

The present invention is related to an optical signal monitoring method and apparatus, which measures precisely the characteristics of a WDM optical signal by compensating for the non-linearity of the driving voltage-transmission wavelength graph of a fiber Fabry-Perot filter.

The foregoing can be achieved by providing an optical signal monitoring method and apparatus for measuring the characteristics of a WDM optical signal. According to one aspect of the present invention, the WDM optical signal is combined with reference lights at both sides of the WDM optical signal on the wavelength spectrum representing light intensities at particular wavelengths. The combined optical signal is input to a filter that has a variable transmission wavelength according to an applied driving voltage. A driving voltage-light intensity graph of the combined optical signal detected from the filter is derived in the overall wavelength band of the combined optical signal. A linear approximated wavelength is obtained with respect to a driving voltage from predetermined wavelengths of the reference lights and driving voltages corresponding with the predetermined wavelengths. A non-linear compensated wavelength is obtained from a predetermined non-linear compensation formula with the driving voltage to compensate for a discrepancy between the transmission wavelength of the filter and the linear approximated wavelength.

According to another aspect of the present invention, in an optical signal monitoring method, a WDM optical signal is combined with reference lights at both sides of the WDM optical signal on the wavelength spectrum representing light intensities at particular wavelengths. The combined optical signal is input to a filter that has a variable transmission wavelength according to an applied driving voltage. A driving voltage-light intensity graph of the combined optical signal detected from the filter is derived in the overall wavelength band of the combined optical signal. A linear approximated wavelength is obtained with respect to a driving voltage from predetermined wavelengths of the reference lights and driving voltages corresponding with the predetermined wavelengths. The operation temperature of the filter is sensed. A non-linear compensated wavelength is obtained from a predetermined non-linear compensation formula with the driving voltage and the operation temperature of the filter to compensate for a discrepancy between the transmission wavelength of the filter and the linear approximated wavelength.

According to a further aspect of the present invention, in an optical signal monitoring apparatus, an optical coupler combines the WDM optical signal with reference lights at both sides of the WDM optical signal on the wavelength spectrum representing light intensities at particular wavelengths. A filter passes only an optical signal at a predetermined wavelength from the combined optical signal received from the optical coupler according to a driving voltage. A filter driver feeds a driving voltage that linearly varies according to an input driving signal. An optical detector opto-electrically converts the optical signal received from the filter to an optical detection signal. A temperature sensor senses the operation temperature of the filter and outputs a temperature sensed signal representing the sensed operation temperature. A controller receives the optical detection signal and the temperature sensed signal, and outputs the driving signal to the filter driver. The controller also obtains a linear approximated wavelength with respect to the driving voltage from predetermined wavelengths of the reference lights and driving voltages corresponding with the predetermined wavelengths. The controller further obtains a non-linear compensated wavelength from a predetermined non-linear compensation formula with the driving voltage and the operation temperature of the filter to compensate for a discrepancy between the transmission wavelength of the filter and the linear approximated wavelength.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
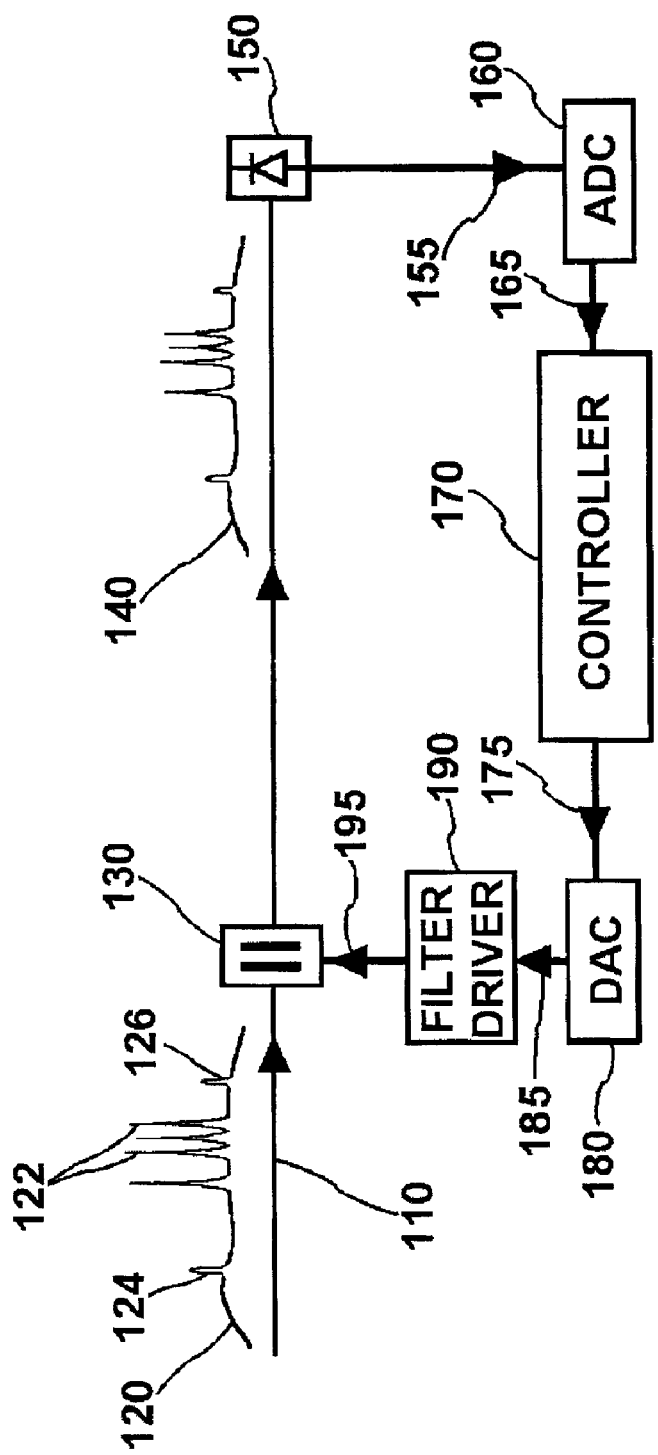
FIG. 1 is a schematic view of a conventional WDM optical signal monitoring apparatus.
Figure 2:
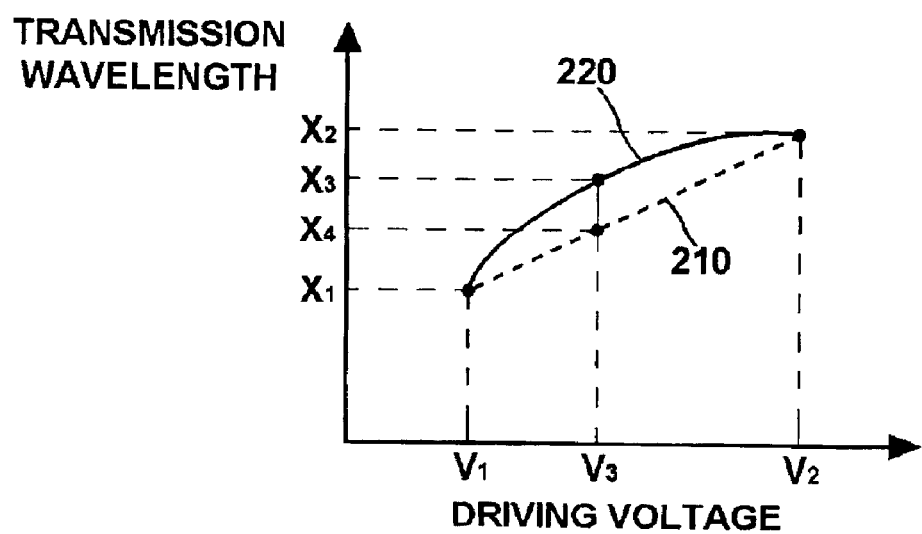
FIG. 2 illustrates a linear approximated wavelength graph and a real wavelength graph for transmission wavelengths of a fiber Fabry-Perot filter shown in FIG. 1 with respect to driving voltages.
Figure 3:
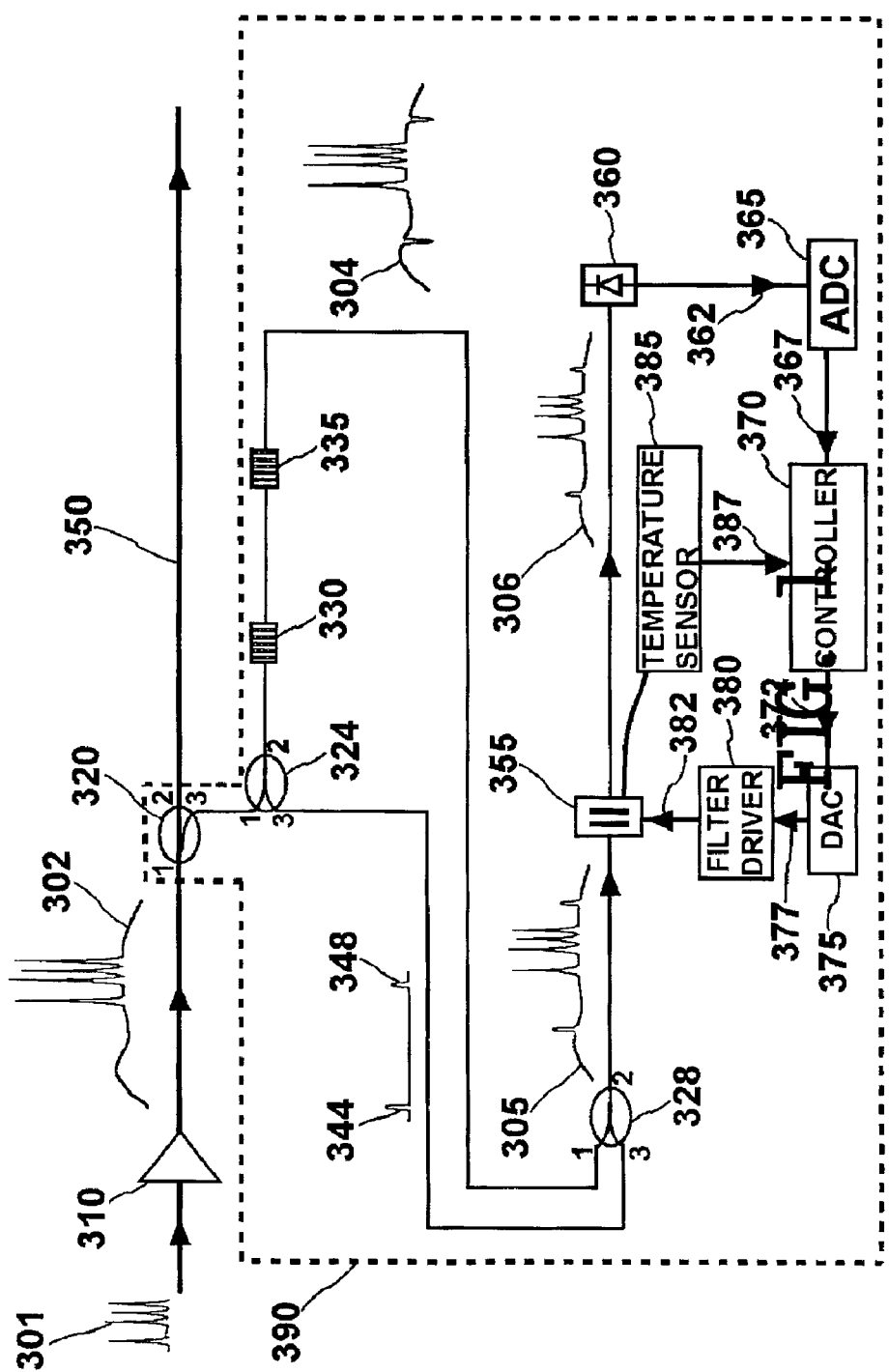
FIG. 3 illustrates a WDM optical signal monitoring apparatus according to a preferred embodiment of the present invention.

FIG. 3 illustrates a WDM optical signal monitoring apparatus according to a preferred embodiment of the present invention. Referring to FIG. 3, the WDM optical signal monitoring apparatus includes an optical fiber 350, an optical amplifier 310, first, second and third couplers 320, 324,328, first and second Bragg gratings 330,335, a Fabry-Perot filter 355, a temperature sensor 385, a optical detector 360, an ADC 365, a DAC 375, a filter driver 380, and a controller 370.

A WDM optical signal 301 travels in the optical fiber 350 and includes a plurality of signal channels. The optical amplifier 310 amplifies the WDM optical signal 301. A fiber amplifier or a semiconductor amplifier may be embodied as the optical amplifier 310. Further, if a fiber amplifier is used, it may be constituted of an Erbium-doped fiber or a Praseodymium-doped fiber.

For the input of a WDM optical signal 302 through a first port, the first coupler 320 outputs 90% of the WDM optical signal 302 through a second port and 10% of the WDM optical signal 302 through a third port. The second coupler 324 outputs the WDM optical signal 302 received through a first port to a second port and two reference lights 344,348 received through a third port to the second port.

The first fiber Bragg grating 330 reflects the first reference light having a first predetermined wavelength from the WDM optical signal 302 received from the second port of the second coupler 324. The second fiber Bragg grating 335 in series with the first fiber Bragg grating 330 reflects the second reference light 348 with a second predetermined wavelength from the WDM optical signal received from the first fiber Bragg grating 330. The third coupler 328 combines 10% of a WDM optical signal received through a first port with 90% of the reference lights 344,348 received through a third port and outputs the combined optical signal 305 through a second port.

The Fabry-Perot filter 355 sequentially transmits the optical signal 305 received from the second port of the third coupler 328 according to a linearly applied driving voltage 382. The temperature sensor 385 senses the operation temperature of the Fabry-Perot filter 355 and outputs a temperature sensed signal 387 representative of the sensed operation temperature to the controller 370. The optical detector 360 converts a combined optical signal 306 received from the Fabry-Perot filter 355 to an analog optical detection signal 362. A photo diode or a charge coupled device (CCD) camera may be embodied as the optical detector 360.

The ADC 365 converts the analog optical detection signal 362 to a digital optical detection signal 367. The DAC 375 converts a digital driving signal 372 received from the controller 370 to an analog driving signal 377. The filter driver 380 applies the driving voltage 382 to the Fabry-Perot filter 355 in accordance with the analog driving signal 377. The controller 370 outputs the digital driving signal 372 to the DAC 375 and receives the digital optical detection signal 367 from the ADC 365.

Figure 4:
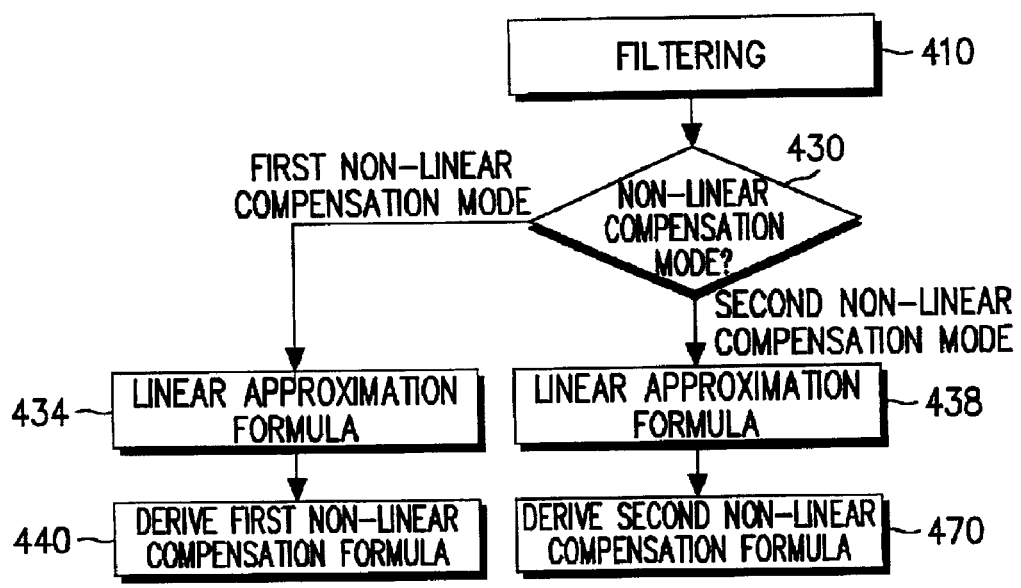
FIG. 4 is a flowchart illustrating a signal process in a controller shown in FIG. 3.

FIG. 4 is a flowchart illustrating a signal process in the controller 370 shown in FIG. 3. Referring to FIG. 4, the signal process includes the steps of filtering (step 410), selecting a non-linear compensation mode (step 430), deriving a linear approximation formula (step 434 or 438), deriving a first non-linear compensation formula (step 440), and deriving a second non-linear compensation formula (step 470).

Figure 5:
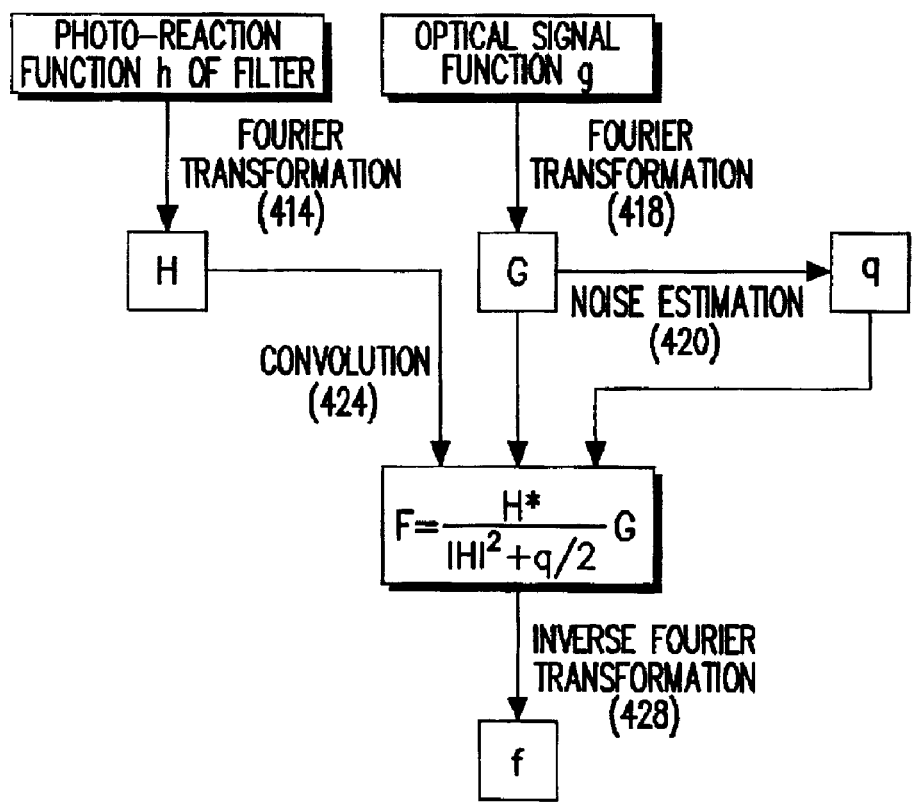
FIG. 5 is a flowchart illustrating a filtering step shown in FIG. 4.

FIG. 5 is a flowchart illustrating the filtering step 410 shown in FIG. 4. The filtering is performed by the steps of first Fourier transformation (step 414), second Fourier transformation (step 418), noise estimation (step 420), convolution (step 424), and inverse Fourier transformation (step 428). The filtering step 410 is implemented in order to remove noise from the digital optical detection signal 367 input to the controller 370.

In step 414, a photo-reaction function h representing the fiber Fabry-Perot filter 355 is Fourier-transformed, resulting in a Fourier-transformed photo-reaction function H. In step 418, an optical signal function g representing a WDM optical signal in the digital optical detection signal 367 is Fourier-transformed, resulting in a Fourier-transformed optical signal function G. In step 420, a noise estimation value q is achieved to remove noise from the WDM optical signal of the digital optical detection signal 367.

Figure 6:
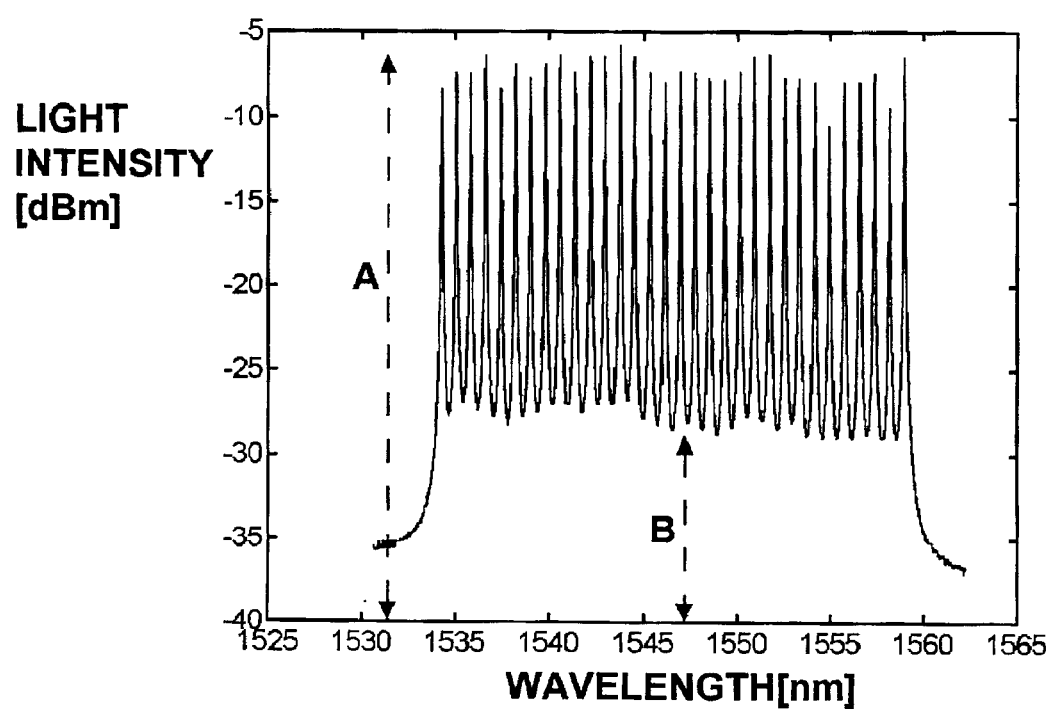
FIG. 6 illustrates a digital optical detection signal shown in FIG. 3.

FIG. 6 is a graph showing light intensities of the WDM optical signal with overlapped noise in the digital optical detection signal 367 shown in FIG. 3 with respect to wavelengths. The intensity A of the WDM optical signal includes the intensity B of the noise.

Returning to FIG. 5, the convolution step 424 is performed using the Fourier-transformed photo-reaction function H, the Fourier-transformed optical signal function G, and the noise estimation value q. Thus, a convolutioned optical signal function F is obtained. In step 428, the convolutioned optical signal function F is inverse-Fourier-transformed. As a result, an inverse-Fourier-transformed optical signal function free of noise is obtained.

Returning to FIG. 4, one of the first and second non-linear compensation modes is selected in step 430. The difference between the two non-linear compensation modes is whether the temperature dependency of the transmission wavelength of the fiber Fabry-Perot filter 355 is considered or not. In the first non-linear compensation mode, the linear approximation formula deriving step 434 and the first non-linear compensation formula deriving step 440 are performed.

In step 434, the linear approximation formula of Eq. (1) is obtained using the predetermined wavelengths $X_1, X_2$ of the reference light 344,348 and driving voltages $V_1, V_2$ related with the wavelengths $X_1, X_2$. In step 440, a first non-linear compensation formula is obtained using the linear approximated wavelength x calculated by Eq. (1) as a variable and a polynomial $P_M(x)$. A wavelength graph in accordance with the first non-linear compensation formula must pass through $(V_1, X_1)$ and $(V_2, X_2)$. Therefore, the first non-linear compensation formula is given as:

$$y = x + (x - X_1)(x - X_2)\sum_{m=0}^{M} a_m x^m Ax + (x - X_1)(x - X_2)P_M(x) \quad (2)$$

where y is a first non-linear compensated wavelength and $a_m$ is an $m^{th}$-order non-linear coefficient. $P_M(x)$ is obtained from empirical data, which implies that M and $a_m$ are determined. Because $a_m$ is determined through a series of formulated computations after M is determined, it is significant to determine M.

Figure 7:
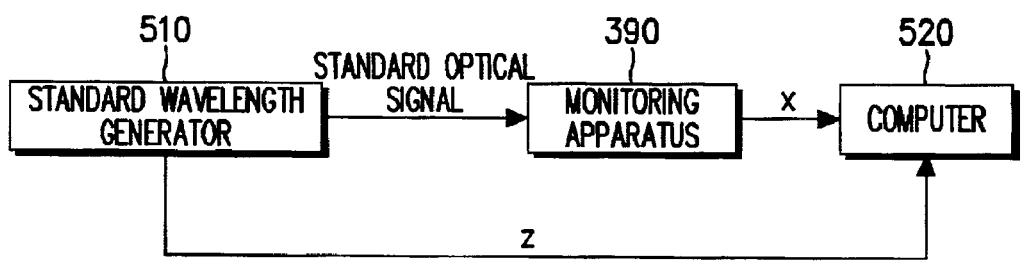
FIG. 7 illustrates a system for deriving a first non-linear compensation formula shown in FIG. 4.

FIG. 7 is a block diagram of a system for deriving the first non-linear compensation formula. Referring to FIG. 7, the system includes a standard wavelength generator 510, the monitoring apparatus 390 shown in FIG. 3, and a computer 520. The standard wavelength generator 510 precisely controls the wavelength of a standard optical signal output to the monitoring apparatus 390. Further, the standard wavelength generator 510 feeds information z about the standard wavelength graph of the standard optical signal to the computer 520.

The monitoring apparatus 390 outputs information x about the linear approximation formula derived from the standard optical signal received from the standard wavelength generator 510 to the computer 520. The computer 520 functions to derive the first non-linear compensation formula representing a wavelength graph most approximate to the standard wavelength graph through a series of signal processes.

Figure 8:
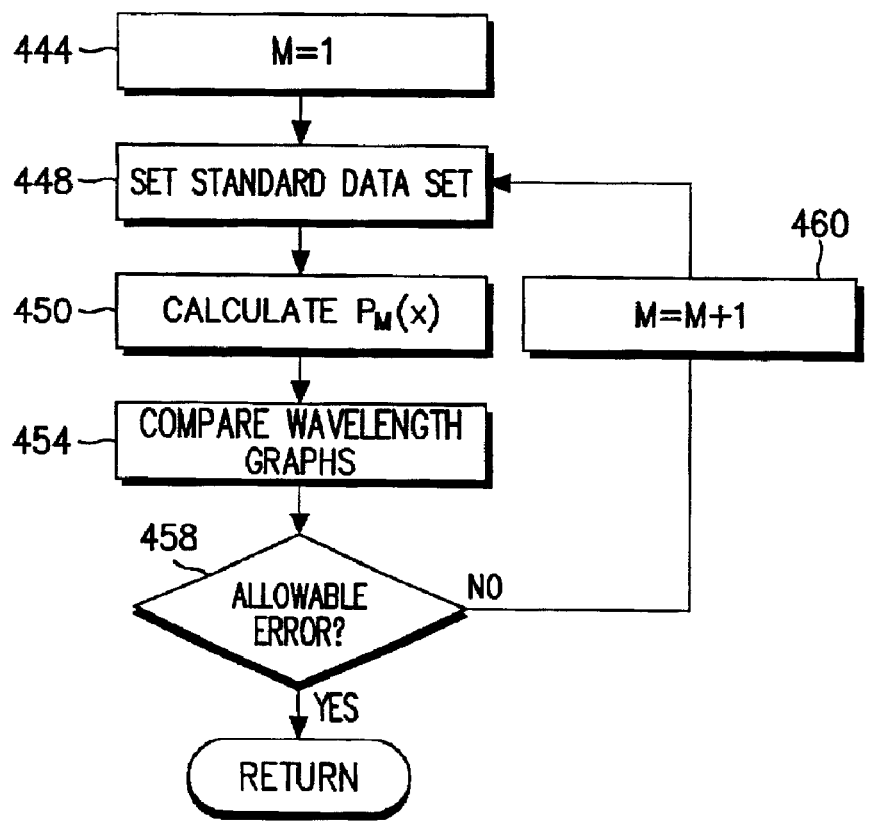
FIG. 8 is a flowchart illustrating a signal process in a computer shown in FIG. 7.

FIG. 8 is a flowchart illustrating the signal processing of the computer 520 shown in FIG. 7. The signal process includes a standard data set setting step 448, a $P_M(x)$ calculation step 450, a wavelength graph comparing step 454, and an allowable error deciding step 458. M is initially set to 1 in step 444, which is a value that is arbitrarily set. Pairs of the linear approximated wavelength x and the standard wavelength z obtained from the standard wavelength graph, $\{(X_0, Z_0), (X_1, Z_1), \ldots, (X_K, Z_K)\}$ are set in step 448. Here, K is (M+1).

In step 450, $P_M(X)$, that is, $a_m$ is calculated using the standard data set by Eq. (2).

$$\begin{pmatrix} 1 & x_0 & x_0^2 & \cdots & x_0^M \\ 1 & x_1 & x_1^2 & \cdots & x_0^M \\ & & \vdots & & \\ 1 & x_K & x_K^2 & \cdots & x_K^M \end{pmatrix} \begin{pmatrix} a_0 \\ a_1 \\ \vdots \\ a_M \end{pmatrix} = \begin{pmatrix} \frac{z_0 - x_0}{(x_0 - X_1)(x_0 - X_2)} \\ \frac{z_1 - x_1}{(x_1 - X_1)(x_1 - X_2)} \\ \vdots \\ \frac{z_K - x_K}{(x_K - X_1)(x_K - X_2)} \end{pmatrix} \therefore \begin{pmatrix} a_0 \\ a_1 \\ \vdots \\ a_M \end{pmatrix} = \quad (3)$$

$$\begin{pmatrix} 1 & x_0 & x_0^2 & \cdots & x_0^M \\ 1 & x_1 & x_1^2 & \cdots & x_0^M \\ & & \vdots & & \\ 1 & x_K & x_K^2 & \cdots & x_K^M \end{pmatrix}^{-1} \begin{pmatrix} \frac{z_0 - x_0}{(x_0 - X_1)(x_0 - X_2)} \\ \frac{z_1 - x_1}{(x_1 - X_1)(x_1 - X_2)} \\ \vdots \\ \frac{z_K - x_K}{(x_K - X_1)(x_K - X_2)} \end{pmatrix}$$

By calculating Eq. (2) with $a_m$ obtained from Eq. (3), the first non-linear compensation formula is derived.

In step 454, the first non-linear compensated wavelength graph represented by the first non-linear compensation formula is compared with the standard wavelength graph. In step 458, it is determined whether the difference between the first non-linear compensated wavelength graph and the standard wavelength graph falls within a predetermined allowable error range. If it does not, M is increased by "1" in step 460 and the procedure returns to step 448.

Figure 9:
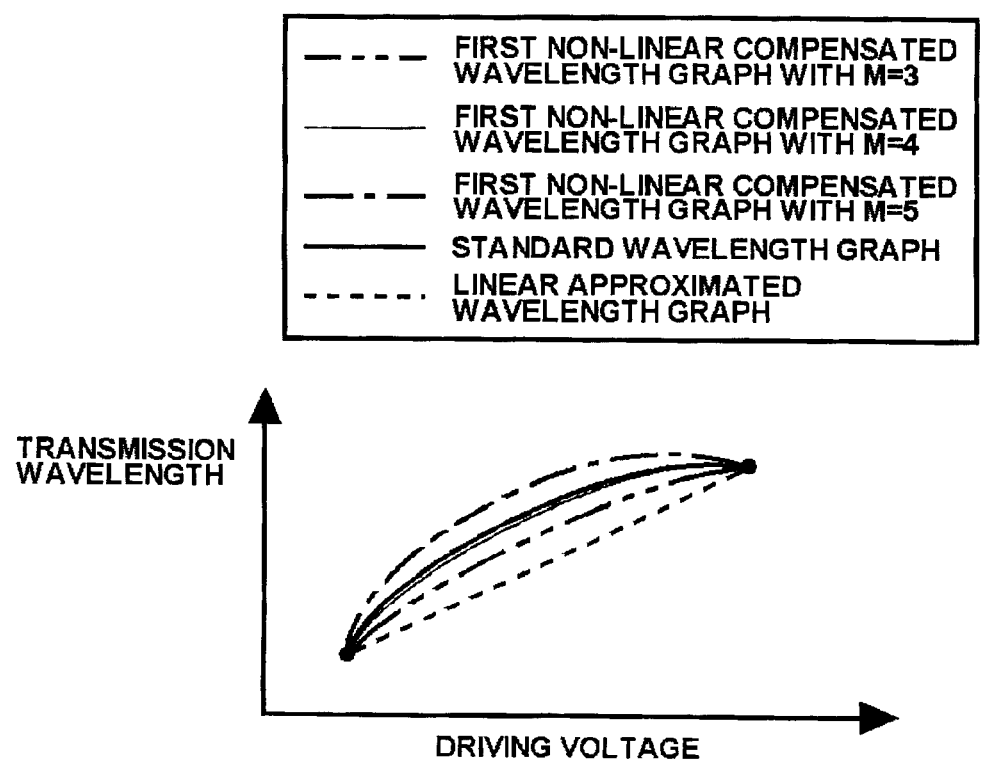
FIG. 9 is a view referred to for describing a wavelength graph comparison step shown in FIG. 8.

FIG. 9 is a diagram referred to for describing step 454 of FIG. 8, which illustrates the linear approximated wavelength graph, a first non-linear compensated wavelength graph with M=3, a first non-linear compensated wavelength graph with M=4, the standard wavelength graph, and a first non-linear compensated wavelength graph with M=5. As shown in FIG. 9, the first non-linear compensated wavelength graph with M=4 is more approximate to the standard wavelength graph than the first non-linear compensated wavelength graph with M=3. The error of the first non-linear compensated wavelength graph with M=4 may exceed a predetermined allowable error value. In this case, M is increased by "1" in step 460 and the procedure returns to step 448.

On the other hand, the first non-linear compensated wavelength graph with M=5 has a larger error than the first non-linear compensated wavelength graph with M=4. In this case, an endless loop is formed in the procedure of FIG. 8. Thus, if the error of a first non-linear compensated wavelength graph with M=b+1 has a larger error than the predetermined allowable error value and that of a first non-linear compensated wavelength graph with M=b, the loop is terminated by setting M to b. Or it is determined whether the error of the present first non-linear compensated wavelength graph is larger than that of the previous first non-linear compensated wavelength graph in step 458.

Returning to FIG. 4 again, the linear approximation formula deriving step 438 and the second non-linear compensation formula deriving step 470 are performed in the second non-linear compensation mode. In step 438, the linear approximation formula of Eq. (1) is obtained using the wavelengths $X_1$, $X_2$ of the reference lights 344,348 and the driving voltages $V_1$, $V_2$ related with the wavelengths $X_1$, $X_2$.

In step 470, a first non-linear compensation formula is obtained using the linear approximated wavelength x achieved from Eq. (1) as a variable and a polynomial $P_{MN}(x, t)$. A wavelength graph in accordance with the second non-linear compensation formula must pass through $(V_1, X_1)$ and $(V_2, X_2)$. Therefore, the second non-linear compensation formula is given as:

$$\lambda = \quad (4)$$

$$x + (x - X_1)(x - X_2) \sum_{m=0}^{M} \sum_{n=0}^{N} c_{m,n} x^m t^n \Delta x + (x - X_1)(x - X_2) P_{MN}(x, t)$$

where $\lambda$ is a second non-linear compensated wavelength, $c_{m, n}$ is an $(m, n)^{th}$-order non-linear coefficient, and t is the product of the driving voltage 382 applied to the fiber Fabry-Perot filter 355 and the operation temperature of the fiber Fabry-Perot filter 355. $P_{MN}(x, t)$ is obtained from empirical data, which implies that M, N and $c_{m,n}$ are determined. Because $c_{m,n}$ is determined through a series of formulated computations after M and N are determined, it is significant to determine M and N.

Figure 10:
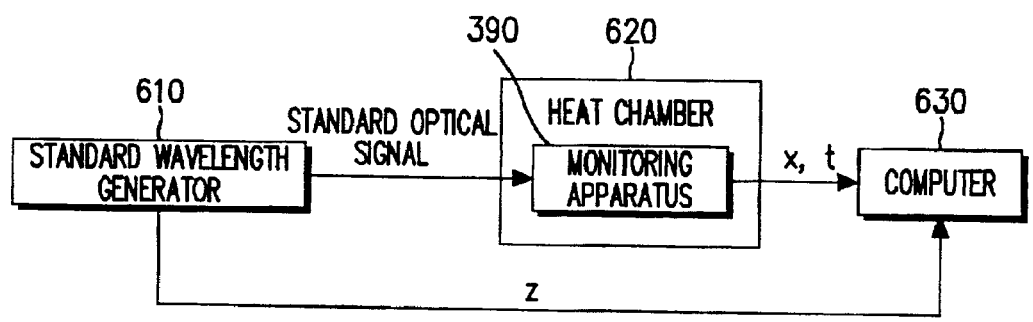
FIG. 10 illustrates a system for deriving a second non-linear compensation formula shown in FIG. 4.

FIG. 10 is a block diagram of a system for deriving the second non-linear compensation formula. Referring to FIG. 10, the system includes a standard wavelength generator 610, a monitoring apparatus 390 as in FIG. 3, a heat chamber 620, and a computer 630. The standard wavelength generator 610 precisely controls the wavelength of a standard optical signal output to the monitoring apparatus 390 and feeds information z about the standard wavelength graph of the standard optical signal to the computer 630.

The monitoring apparatus 390 outputs information x about the linear approximation formula derived from the standard optical signal received from the standard wavelength generator 610 and information t about the operation temperature of the fiber Fabry-Perot filter 355 to the computer 630. The heat chamber 620 controls the ambient temperature of the monitoring apparatus 390 similar to the operation temperature of the fiber Fabry-Perot filter 355. The computer 630 functions to derive the second non-linear compensation formula representing a wavelength graph most approximate to the standard wavelength graph through a series of processes.

Figure 11:
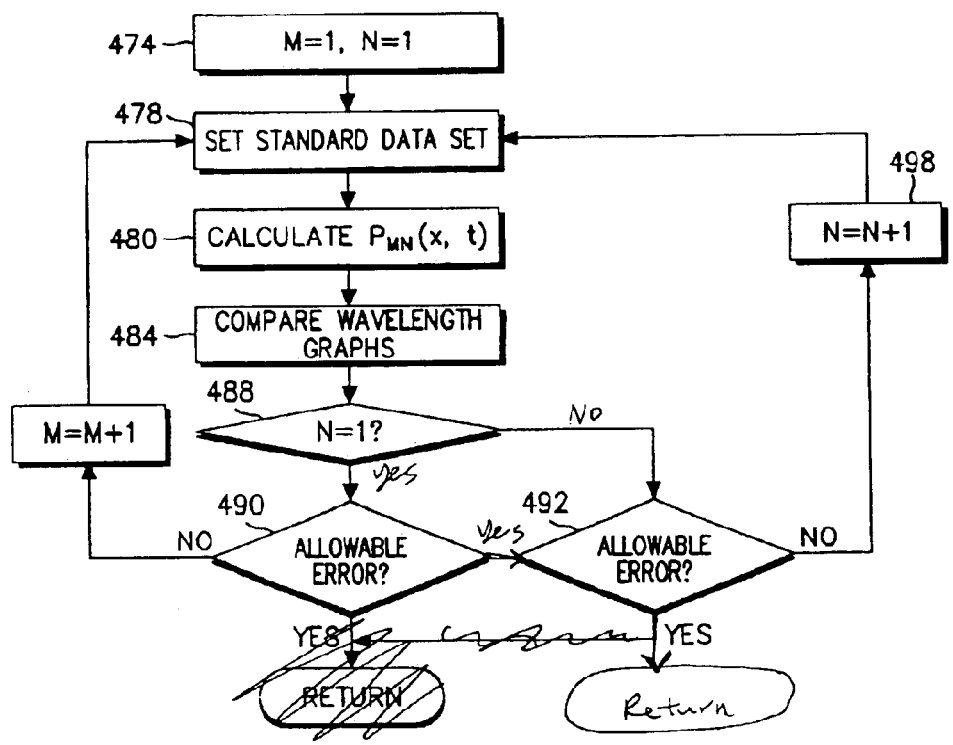
FIG. 11 is a flowchart illustrating a signal process in a computer shown in FIG. 10.

FIG. 11 is a flowchart illustrating the processing of the computer 630 shown in FIG. 10. The process includes a standard data setting step 478, a $P_{MN}(x, t)$ calculation step 480, a wavelength graph comparing step 484, an N determination step 488, and an allowable error deciding step 490 or 492. The process is performed repeatedly for t in a predetermined range (e.g., $t_S \leq t < t_E$). M and N are initially both set to "1" in step 474, which are values chosen arbitrarily.

Pairs of the linear approximated wavelength x for t and the standard wavelength z obtained from the standard wavelength graph, $\{(x_0, z_0), (x_1, z_1), \ldots, (x_K, Z_K)\}$ are set in step 478. Here, K is (M×N+1). In step 480, $P_{MN}(x, t)$, that is, $c_{m,n}$ is calculated using the standard data set in Eq. (4). Since $c_{m,n}$ is calculated in a similar manner to Eq. (3), its detailed description is avoided here. By calculating Eq. (4) with the obtained $c_{m,n}$, the second non-linear compensation formula is derived.

In step 484, the second non-linear compensated wavelength graph represented by the second non-linear compensation formula is compared with the standard wavelength graph. In step 488, N is changed if M is determined from the previous steps. Once the N determination step is entered, M is fixed. In step 490 or 492, it is determined whether the difference between the second non-linear compensated wavelength graph and the standard wavelength graph falls within a predetermined allowable error range. If it does not, M or N is increased by "1" in step 494 or 498 and the procedure returns to step 478. The error of the present first or second non-linear compensated wavelength graph can be neglected if it is equal to or less than that of the previous first or second non-linear compensated wavelength graph.

Figure 12:
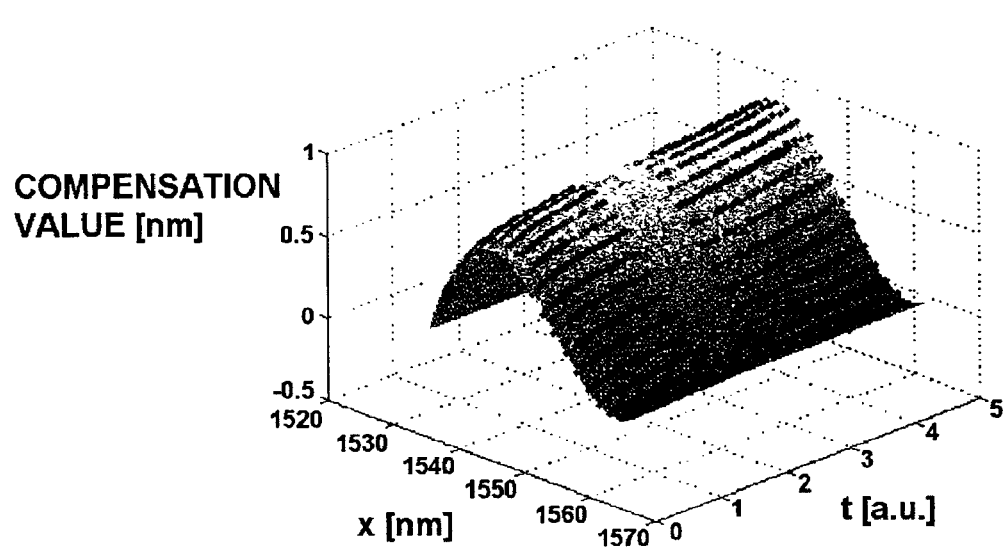
FIG. 12 is a view referred to for describing the difference between a second non-linear compensated wavelength graph according to the present invention and a linear approximated wavelength graph.

FIG. 12 is a three-dimensional graph showing the difference between the second non-linear wavelength graph according to the present invention and a linear approximated wavelength graph. As noted from the graph, a compensated value markedly changes at a linear approximated wavelength, whereas it slightly changes for t reflecting the operation temperature of the fiber Fabry-Perot filter. Here, the operation temperature is between 0 and 60° C. and M and N of $P_{MN}(x, t)$ are both equal to "4".

Figure 13A:
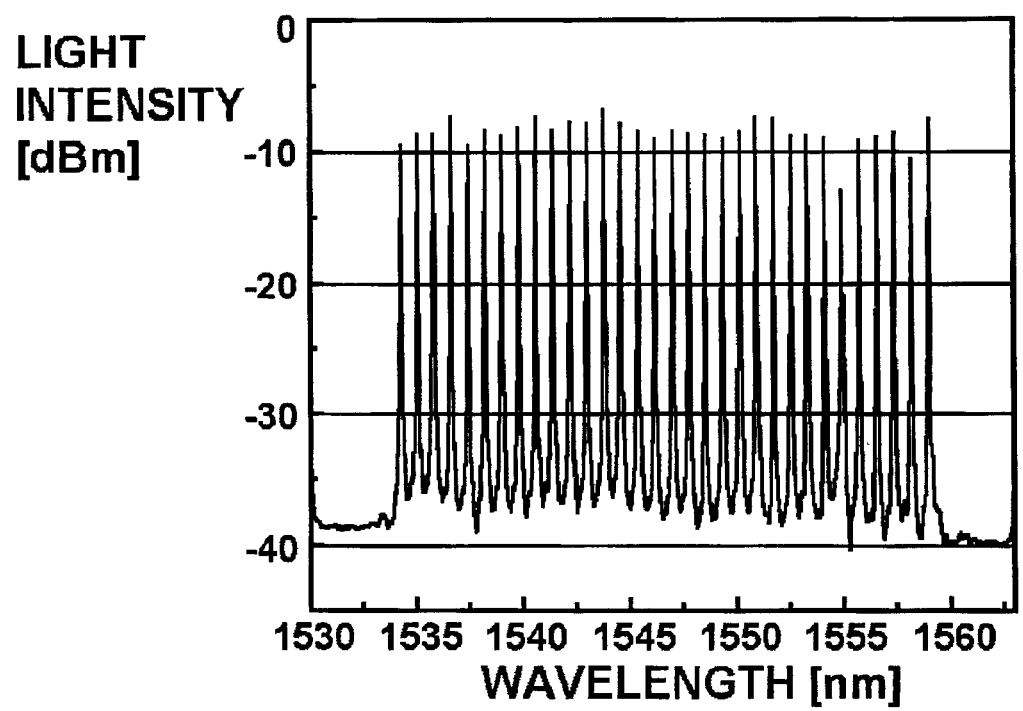
FIG. 13A illustrates an intensity distribution of a WDM optical signal with respect to wavelengths, measured using a light spectrum analyzer.
Figure 13B:
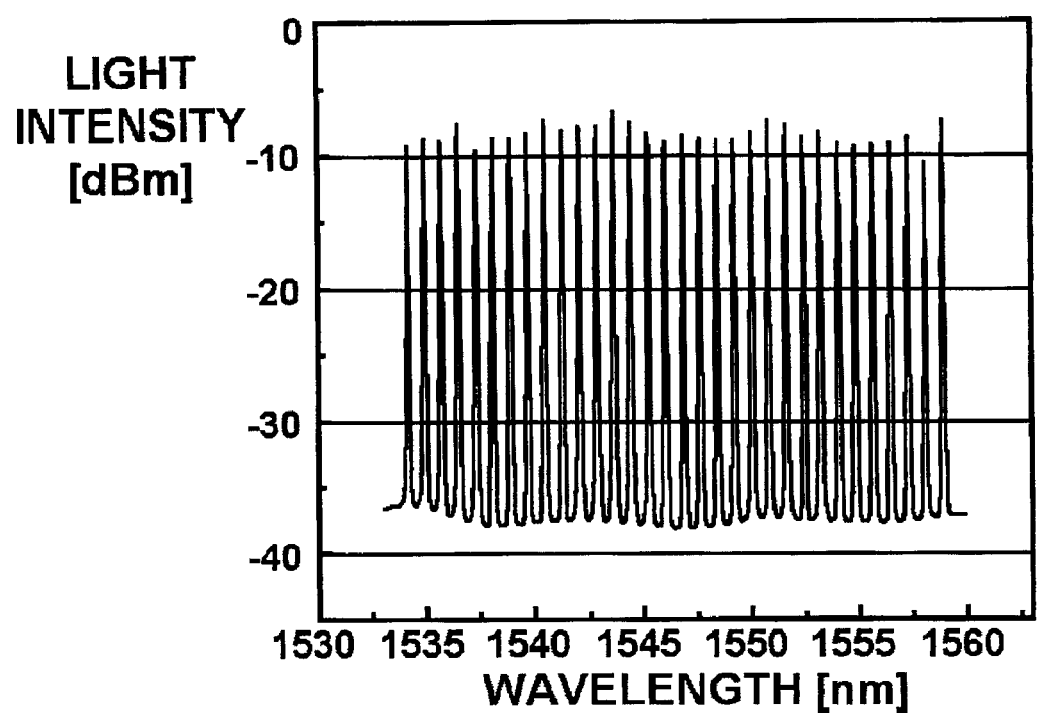
FIG. 13B illustrates a non-linear compensated wavelength graph measured in the WDM optical signal monitoring apparatus according to the present invention.

FIG. 13A is a graph showing an intensity distribution of a WDM optical signal measured using an optical spectrum analyzer with respect to wavelengths. FIG. 13B is a graph showing an intensity distribution of the WDM optical signal shown in FIG. 13A, measured using the WDM optical signal monitoring apparatus with respect to wavelengths. As noted, the graphs shown in FIGS. 13A and 13B are very similar. The graph of FIG. 13A illustrates a WDM optical signal with overlapping noise and the graph of FIG. 13B illustrates a WDM optical signal free of noise.

Figure 14A:
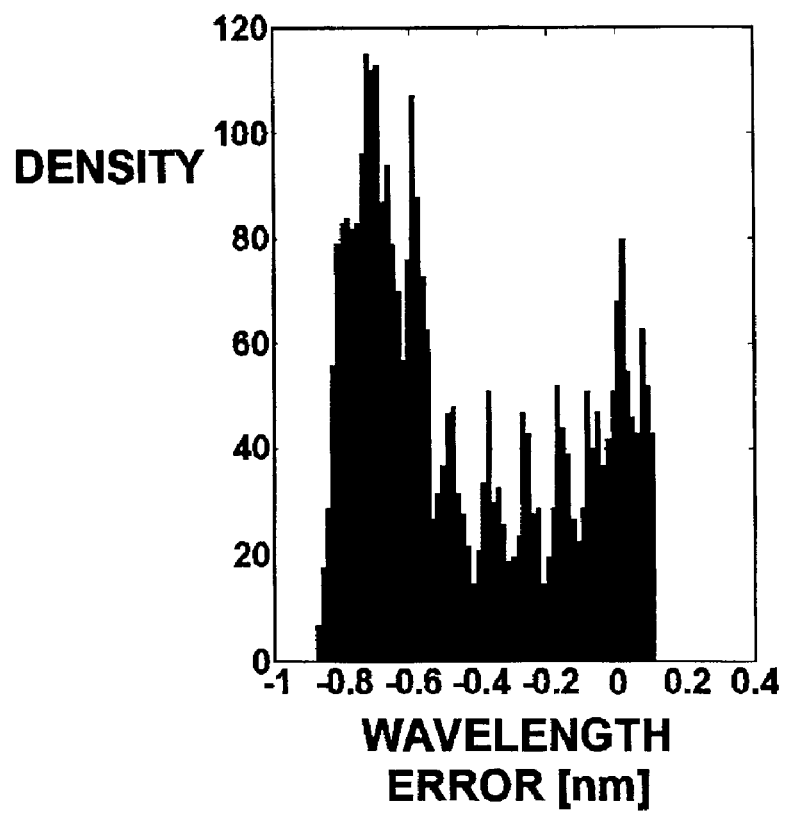
FIG. 14A illustrates a wavelength error distribution in the case where the optical signal shown in FIG. 13A is linearly approximated.
Figure 14B:
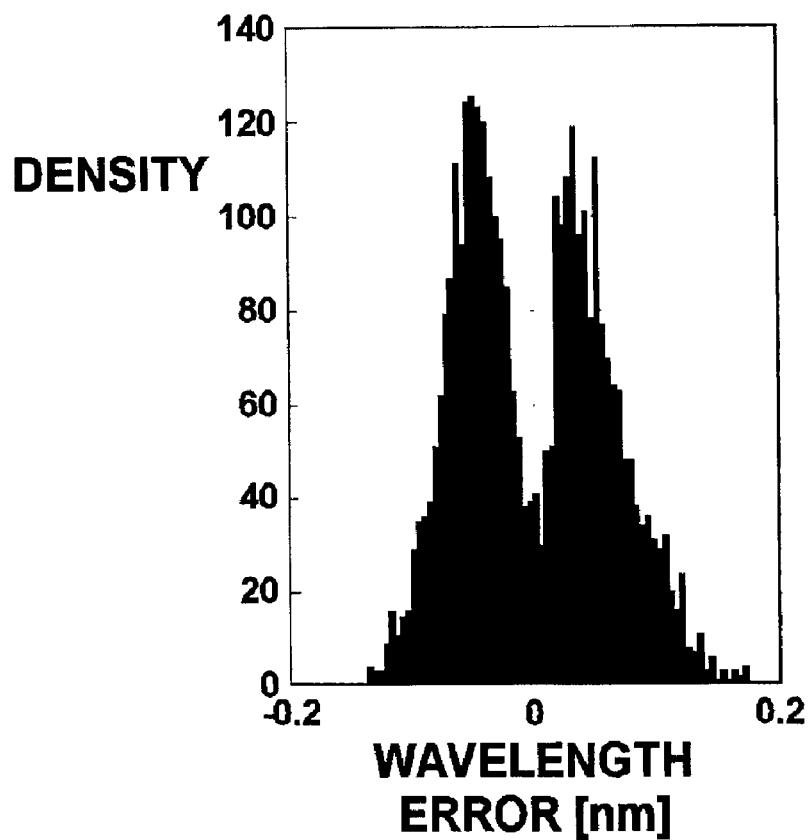
FIG. 14B illustrates a wavelength error distribution in the case of first non-linear compensation of the optical signal shown in FIG. 13A.
Figure 14C:
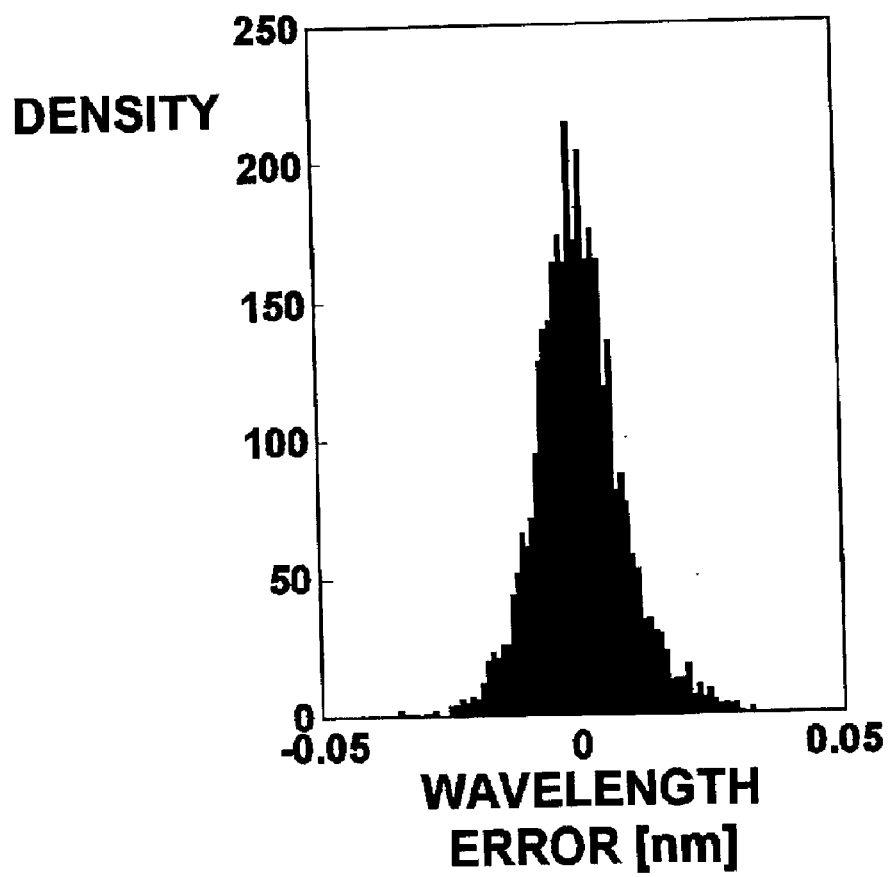
FIG. 14C illustrates a wavelength error distribution in the case of second non-linear compensation of the optical signal shown in FIG. 13A.

FIG. 14A is a graph showing a wavelength error distribution in the case where the optical signal shown in FIG. 13A is linearly approximated. FIG. 14B is a graph showing a wavelength error distribution in the case where the optical signal shown in FIG. 13A is compensated at the first non-linear mode. FIG. 14C is a graph showing a wavelength error distribution in the case where the optical signal shown in FIG. 13A is compensated at the second non-linear mode. The wavelength errors are decreased in the order of the linear approximation, the first non-linear compensation, and the second non-linear compensation.

As described above, the WDM optical signal monitoring apparatus and method according to the present invention advantageously compensate for the non-linearity of the driving voltage-transmission wavelength graph of a fiber Fabry-Perot filter using a first or second non-linear compensation formula. Therefore, the characteristics of a WDM optical signal such as wavelength and noise can be more accurately measured than in the conventional technology.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical signal monitoring method for measuring the characteristics of a wavelength division multiplexing (WDM) optical signal, comprising the steps of:

combining the WDM optical signal with reference lights to form a combined optical signal;

inputting the combined optical signal to a filter that has a variable transmission wavelength according to an applied driving voltage;

obtaining a linear approximated wavelength with respect to a driving voltage from predetermined wavelengths of the reference lights and driving voltages corresponding to the predetermined wavelengths; and obtaining a non-linear compensated wavelength from a predetermined non-linear compensation formula with the driving voltage to compensate for a discrepancy between a transmission wavelength of the filter and the linear approximated wavelength.

2. The optical signal monitoring method of claim 1, wherein the linear approximated wavelength is determined by:

$$x = \frac{X_1 - X_2}{V_1 - V_2}(v - V_1) + X_1 \qquad (5)$$

where x is the linear approximated wavelength, $X_1$ is a first predetermined wavelength, $V_1$ is a first driving voltage, $X_2$ is a second predetermined wavelength, $V_2$ is a second driving voltage, and v is the driving voltage related with x.

3. The optical signal monitoring method of claim 2, wherein the non-linear compensation formula is expressed as:

$$y = x + (x - X_1)(x - X_2) \sum_{m=0}^{M} a_m x^m Ax + (x - X_1)(x - X_2) P_M(x) \qquad (7)$$

where y is the non-linear compensated wavelength, x is the linear approximated wavelength, $X_1$ is a first predetermined wavelength, $X_2$ is a second predetermined wavelength, M is an arbitrary integer, and $a_m$ is an $m^{th}$-order non-linear coefficient.

4. The optical signal monitoring method of claim 1, wherein the non-linear compensation formula is expressed as:

$$y = x + (x - X_1)(x - X_2) \sum_{m=0}^{M} a_m x^m Ax + (x - X_1)(x - X_2) P_M(x) \qquad (6)$$

where y is the non-linear compensated wavelength, x is the linear approximated wavelength, $X_1$ is a first predetermined wavelength, $X_2$ is a second predetermined wavelength, M is an arbitrary constant, and $a_m$ is an $m^{th}$-order non-linear coefficient.

5. The optical signal monitoring method of claim 1, wherein the filter is a fiber Fabry-Perot filter.

6. The optical signal monitoring method of claim 1, wherein the reference lights are combined at both sides of the WDM optical signal on the wavelength spectrum representing light intensities at particular wavelengths.

7. The optical signal monitoring method of claim 1, which further includes deriving a driving voltage-light intensity graph of a combined optical signal detected from the filter in the overall wavelength band of the combined optical signal.

8. An optical signal monitoring method for measuring the characteristics of an input wavelength division multiplexing (WDM) optical signal, comprising the steps of:

combining the WDM optical signal with reference lights to form a combined optical signal;

inputting the combined optical signal to a filter that has a variable transmission wavelength according to an applied driving voltage;

obtaining a linear approximated wavelength with respect to a driving voltage from predetermined wavelengths of the reference lights and driving voltages corresponding to the predetermined wavelengths;

sensing the operation temperature of the filter; and obtaining a non-linear compensated wavelength from a predetermined non-linear compensation formula with the driving voltage and the operation temperature of the filter to compensate for a discrepancy between a transmission wavelength of the filter and the linear approximated wavelength.

9. The optical signal monitoring method of claim 8, wherein the linear approximated wavelength is determined by:

$$x = \frac{X_1 - X_2}{V_1 - V_2}(v - V_1) + X_1 \quad (8)$$

where x is the linear approximated wavelength, $X_1$ is a first predetermined wavelength, $V_1$ is a first driving voltage, $X_2$ is a second predetermined wavelength, $V_2$ is a second driving voltage, and v is the driving voltage related with x.

10. The optical signal monitoring method of claim 9, wherein the non-linear compensation formula is expressed as:

$$\lambda = \quad (10)$$
$$x + (x - X_1)(x - X_2) \sum_{m=0}^{M} \sum_{n=0}^{N} c_{m,n} x^m t^n Ax + (x - X_1)(x - X_2) P_{MN}(x, t)$$

where $\lambda$ is the non-linear compensated wavelength, x is the linear approximated wavelength, $X_1$ is a first predetermined wavelength, $X_2$ is a second predetermined wavelength, M is an arbitrary integer, N is an arbitrary integer, $c_{m,n}$ is an $(m, n)^{th}$-order non-linear coefficient, and t is the product of the driving voltage related with x and the operation temperature of the filter.

11. The optical signal monitoring method of claim 8, wherein the non-linear compensation formula is expressed as:

$$\lambda = \quad (9)$$
$$x + (x - X_1)(x - X_2) \sum_{m=0}^{M} \sum_{n=0}^{N} c_{m,n} x^m t^n Ax + (x - X_1)(x - X_2) P_{MN}(x, t)$$

where $\lambda$ is the non-linear compensated wavelength, x is the linear approximated wavelength, $X_1$ is a first predetermined wavelength, $X_2$ is a second predetermined wavelength, M is an arbitrary integer, N is an arbitrary integer, $c_{m,n}$ is an $(m, n)^{th}$-order non-linear coefficient, and t is the product of the driving voltage related with x and the operation temperature of the filter.

12. The optical signal monitoring method of claim 8, wherein the filter is a fiber Fabry-Perot filter.

13. The optical signal monitoring method of claim 8, wherein the reference lights are combined at both sides of the WDM optical signal on the wavelength spectrum representing light intensities at particular wavelengths.

14. The optical signal monitoring method of claim 8, which further includes deriving a driving voltage-light intensity graph of a combined optical signal detected from the filter in the overall wavelength band of the combined optical signal.

15. An optical signal monitoring apparatus for measuring the characteristics of a wavelength division multiplexing (WDM) optical signal, comprising:

an optical coupler for combining the WDM optical signal with reference lights to form a combined optical signal;

a filter for passing only an optical signal at a predetermined wavelength from the combined optical signal received from the optical coupler according to a driving voltage;

a filter driver for feeding a driving voltage that linearly varies according to an input driving signal;

an optical detector for opto-electrically converting the optical signal received from the filter to an optical detection signal;

a temperature sensor for sensing the operation temperature of the filter and outputting a temperature sensed signal representing the sensed operation temperature; and a controller for receiving the optical detection signal and the temperature sensed signal, outputting the driving signal to the filter driver, obtaining a linear approximated wavelength with respect to the driving voltage from predetermined wavelengths of the reference lights and driving voltages corresponding to the predetermined wavelengths, and obtaining a non-linear compensated wavelength from a predetermined non-linear compensation formula with the driving voltage and the operation temperature of the filter to compensate for a discrepancy between a transmission wavelength of the filter and the linear approximated wavelength.

16. The optical signal monitoring apparatus of claim 15, wherein the linear approximated wavelength is determined by:

$$x = \frac{X_1 - X_2}{V_1 - V_2}(v - V_1) + X_1 \quad (11)$$

where x is the linear approximated wavelength, $X_1$ is a first predetermined wavelength, $V_1$ is a first driving voltage, $X_2$ is a second predetermined wavelength, $V_2$ is a second driving voltage, and v is the driving voltage related with x.

17. The optical signal monitoring apparatus of claim 16, wherein the non-linear compensation formula is expressed as:

$$\lambda = x + (x - X_1)(x - X_2) \sum_{m=0}^{M} \sum_{n=0}^{N} c_{m,n} x^m t^n Ax + \quad (13)$$
$$(x - X_1)(x - X_2) P_{MN}(x, t)$$

where $\lambda$ is the non-linear compensated wavelength, x is the linear approximated wavelength, $X_1$ is a first predetermined wavelength, $X_2$ is a second predetermined wavelength, M is an arbitrary integer, N is an arbitrary integer, $c_{m,n}$ is an $(m, n)^{th}$-order non-linear coefficient, and t is the product of the driving voltage related with x and the operation temperature of the filter.

18. The optical signal monitoring apparatus of claim 15, wherein the non-linear compensation formula is expressed as:

$$\lambda = x + (x - X_1)(x - X_2) \sum_{m=0}^{M} \sum_{n=0}^{N} c_{m,n} x^m t^n Ax + \quad (12)$$
$$(x - X_1)(x - X_2) P_{MN}(x, t)$$

where $\lambda$ is the non-linear compensated wavelength, x is the linear approximated wavelength, $X_1$ is a first predetermined wavelength, $X_2$ is a second predetermined wavelength, M is an arbitrary integer, N is an arbitrary integer, $c_{m,n}$ is an $(m, n)^{th}$-order non-linear coefficient, and t is the product of the driving voltage related with x and the operation temperature of the filter.

19. The optical signal monitoring apparatus of claim 15, wherein the filter is a fiber Fabry-Perot filter.

20. The optical signal monitoring apparatus of claim 15, wherein the reference lights are combined at both sides of the WDM optical signal on the wavelength spectrum representing light intensities at particular wavelengths.

* * * * *